(12) United States Patent
Fernandez Garcia

(10) Patent No.: US 12,553,707 B2
(45) Date of Patent: Feb. 17, 2026

(54) METHOD OF DETERMINING RADIAL PLAY IN A BEARING ARRANGEMENT

(71) Applicant: Vestas Wind Systems A/S, Aarhus (DK)

(72) Inventor: Borja Fernandez Garcia, Asturias (ES)

(73) Assignee: Vestas Wind Systems A/S, Aarhus N. (DK)

(*) Notice: Subject to any disclaimer, the term of this patent is extended or adjusted under 35 U.S.C. 154(b) by 216 days.

(21) Appl. No.: 18/250,460

(22) PCT Filed: Sep. 1, 2021

(86) PCT No.: PCT/DK2021/050267
§ 371 (c)(1),
(2) Date: Apr. 25, 2023

(87) PCT Pub. No.: WO2022/089700
PCT Pub. Date: May 5, 2022

(65) Prior Publication Data
US 2024/0011765 A1    Jan. 11, 2024

(30) Foreign Application Priority Data

Oct. 27, 2020    (DK) .......................... PA 2020 70712

(51) Int. Cl.
*G01B 11/14*    (2006.01)
*F03D 17/00*    (2016.01)
(Continued)

(52) U.S. Cl.
CPC ............ *G01B 11/14* (2013.01); *F03D 17/012* (2023.08); *G01M 13/04* (2013.01);
(Continued)

(58) Field of Classification Search
CPC ...... G01B 11/14; F03D 17/012; F03D 17/002; F03D 17/032; F03D 13/30; F03D 80/70;
(Continued)

(56) References Cited

U.S. PATENT DOCUMENTS

| 10,975,908 B1* | 4/2021 | Reichhart .............. F16C 19/386 |
| 2015/0116131 A1* | 4/2015 | Ikeda .................. G05B 23/0235 |
| | | 340/870.07 |

(Continued)

FOREIGN PATENT DOCUMENTS

| CN | 106595464 A | 4/2017 | |
| CN | 110631493 A * | 12/2019 | .............. G01B 11/14 |

(Continued)

OTHER PUBLICATIONS

International Searching Authority, International Search Report and Written Opinion issued in corresponding PCT Application No. PCT/DK2021/050267, mailed Nov. 2, 2021.

(Continued)

*Primary Examiner* — Tarifur R Chowdhury
*Assistant Examiner* — Joshua M Carlson
(74) *Attorney, Agent, or Firm* — Wood Herron & Evans LLP

(57) ABSTRACT

A method for determining radial play of a bearing arrangement in a wind turbine component, the bearing arrangement comprising a first component and a second component, which are movable relative to one another in a radial direction. The method comprises: capturing a first image of the bearing arrangement, the first image including the first and second components in a first relative position; applying a radially-directed load to the bearing arrangement to move the first component radially with respect to the second component by a distance that defines the radial play of the bearing arrangement so that the first and second components (Continued)

are in a second relative position; capturing a second image of the bearing arrangement, the second image including the first and second components in the second relative position; and comparing the first and second images to quantify the difference between the first relative position of the first and second components and the second relative position of the first and second components, thereby to determine the radial play in the bearing arrangement.

15 Claims, 6 Drawing Sheets

(51) Int. Cl.
*G01M 13/04* (2019.01)
*G06T 7/00* (2017.01)

(52) U.S. Cl.
CPC ... *F05B 2260/83* (2013.01); *F05B 2270/8041* (2013.01); *F16C 2233/00* (2013.01); *F16C 2360/31* (2013.01); *G06T 7/001* (2013.01)

(58) Field of Classification Search
CPC .................. F03D 80/703; G01M 13/04; F05B 2270/8041; F05B 2240/50; F05B 2270/804; F05B 2240/54; F16C 2360/31; Y02E 10/72
See application file for complete search history.

(56) References Cited

U.S. PATENT DOCUMENTS

| 2017/0114656 | A1 | 4/2017 | Gallimore | |
|---|---|---|---|---|
| 2017/0234772 | A1* | 8/2017 | Nirmalan | G01M 15/14 250/340 |
| 2021/0239097 | A1* | 8/2021 | Eliason | B23P 6/00 |
| 2022/0042787 | A1* | 2/2022 | Strikovski | G01B 11/026 |
| 2022/0243706 | A1* | 8/2022 | Hoelzl | F16C 25/02 |
| 2022/0404176 | A1* | 12/2022 | Falkenstein | G01M 13/04 |

FOREIGN PATENT DOCUMENTS

| CN | 111678449 A * | 9/2020 | ............ G01B 11/14 |
|---|---|---|---|
| DE | 202015008938 U1 | 4/2016 | |
| EP | 3196627 A1 | 7/2017 | |
| WO | 2019110624 A1 | 6/2019 | |

OTHER PUBLICATIONS

Danish Patent and Trademark Office, Examination Report issued in corresponding DK Application No. PA 2020 70712, dated Apr. 13, 2021.

* cited by examiner

METHOD OF DETERMINING RADIAL PLAY IN A BEARING ARRANGEMENT

TECHNICAL FIELD

The invention relates to a method for determining the radial play in a bearing arrangement. Although the invention is applicable to bearing arrangements and assemblies in general, it is particularly useful in high load applications such as bearing arrangements that are used in wind turbine transmissions.

BACKGROUND

Typically, a horizontal-axis wind turbine (HAWT) includes a gearbox located between a main rotor shaft and an electrical generator, which serve to increase the rotational speed of the main rotor shaft to a speed that is appropriate for the generator input drive. Such a gearbox may have one or more gear stages. As is known, a gearbox, also called a 'transmission', houses a number of bearings for supporting and allowing rotation of respective components, e.g. shafts or gear components. For instance, an input drive shaft of a gearbox is supported by at least one bearing, and other bearings may support an output shaft and also planetary gears in an epicyclic gearbox.

One problem that affects high load applications particularly is the issue of wear of the inner and outer bearing races, which can lead to excessive radial play. In turn excessive radial play can cause misalignment to meshing gear teeth which can increase the wear rate of these components. For this reason, it is usual to have inspection schedules for monitoring the extent of radial play so any excessive movement can be identified early. This is typically achieved by way of a manual process involving a maintenance technician gaining access to the gearbox housing and using a gauge to check the radial play of the gear teeth in response to a radial load being applied. However, this process is problematic for various reasons. Firstly, it can be difficult to gain access to appropriate measurement points in the gearbox due to tight confines of a wind turbine nacelle, and this may particularly be the case for an intermediate gear stage in a gearbox which may be sandwiched between other transmission components. Also, whilst such a process requires the main rotor to be locked into a rotationally fixed position, even a slight movement of the main rotor may result in a significant rotation of a downstream gearbox shaft due to the transmission ratios involved.

So, despite the main rotor being locked, the technician may experience moving gear wheels, which presents a health and safety risk.

Against this background, it is desirable to develop an improved process to determine radial play which solves one or more of the technical challenges inherent in the conventional approach.

SUMMARY OF THE INVENTION

According to a first aspect of the invention, there is provided a method for determining radial play of a bearing arrangement in a wind turbine component, the bearing arrangement comprising at least a first component and a second component which are movable relative to one another in a radial direction to define the radial play of the bearing arrangement. The method comprises:

capturing a first image of the bearing arrangement, wherein the first image includes the first component and the second component in a first relative position;

applying a radially-directed load to the bearing arrangement to move the first component radially with respect to the second component by a distance that defines the radial play of the bearing arrangement so that the first and second components are in a second relative position;

capturing a second image of the bearing arrangement, wherein the second image includes the first component and the second component in the second relative position; and comparing the first and second images to quantify the difference between the first relative position of the first and second components and the second relative position of the first and second components, thereby to determine the radial play in the bearing arrangement.

Advantageously, the invention provides a process for determining the radial play in a bearing arrangement that does not require the conventional manual approach of using a gauge. Since the image capture happens in a direction in line with the rotational axis of the bearing arrangement, slight rotation of the bearing arrangement during the measurement process does not adversely affect the result, as it does in the conventional approach.

Moreover, the process doesn't require for a maintenance technician to extend their hand towards moving components, such as meshing gear teeth, as is the case in the conventional approach, which thereby removes this potential hazard from the gearbox inspection regime.

The image comparison process may further comprise: determining a first dimension between the first component and the second component in the first image; determining a second dimension between the first component and the second component in the second image; comparing the first dimension and the second dimension to find a difference value; and determining whether the distance value exceeds a radial play threshold.

In one example, at least one of the first and second images may include a reference feature of the bearing arrangement, wherein the reference feature has a predetermined size thus providing a datum for the comparison. The reference feature may be a mark or other indication of a predetermined size that provides a known scale into the image. Another option is that the reference feature may be a component having a known dimension. For example, a bolt head in the image may provide a known dimension and so can be used as a reference scale.

In the above examples of the invention, the first component may be one or more of: i) a bearing cage, ii) a roller element, and iii) a bearing ring, whilst the second component may be a housing portion of the bearing arrangement. The housing portion is therefore static relative to the rotating parts of the bearing arrangement, and so there is relative movement between the first and second components during radial play.

During image capture, a camera may be supported inside a housing of the wind turbine component, in one example. In other examples, it may be possible to support the camera outside of the housing. It is envisaged that in the latter example, a flexible and/or telescopic and/or an extendable lens system may extend into the housing.

It is envisaged that the camera may be a permanent fixture in the housing. Alternatively, it may be removed from the housing after capturing the second image. This may avoid the camera being damaged or succumbing to the dirty environment around the gearbox.

Preferably, to ensure that the first and second images are accurate and the resulting radial play measurements are accurate, the first image relates to a predetermined region of the bearing area, and second image relates to the same predetermined region of the bearing arrangement. Here, the term predetermined region means the image boundary that is captured by the camera. In other words, the two images are taken in succession without changing the position of the camera, or the zoom value of the camera, for example.

In a preferred embodiment, said wind turbine component is a gearbox comprising at least two gear stages, for instance at least one planetary gear stage and at least one spur gear stage. In particular the method is believed to be favourable for a gearbox including three stages, one planetary and two parallel spur gear stages and in particular for the middle stage, which is squeezed in between the other two stages and therefore difficult to access by known methods. One way to insert the camera for capturing images is through an inspection port in the gearbox.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The above and other aspects of the invention will now be described, by way of example only, with reference to the accompanying drawings, in which.

Note that features that are the same or similar in different drawings are denoted by like reference signs.

SPECIFIC DESCRIPTION

A specific embodiment of the invention will now be described in which numerous features will be discussed in detail in order to provide a thorough understanding of the inventive concept as defined in the claims. However, it will be apparent to the skilled person that the invention may be put into effect without the specific details and that in some instances, well known methods, techniques and structures have not been described in detail in order not to obscure the invention unnecessarily.

In overview the invention provides a visual inspection approach for determining whether the radial play in a bearing arrangement is excessive. In essence, the process involves capturing at least two images of components of the bearing arrangement before and after the bearing arrangement has been subject to radial play, and comparing the relative position of those components between the two images. By observing and measuring how the relative position of the components shift between the two images, the extent of radial play can be determined. Once the extent of radial play has been determined, a decision can be made about whether the radial play is acceptable. Such an approach has benefits over conventional approaches because it does not require the use of mechanical gauges by skilled operators to measure radial play manually, which processes are typically subject to measurement inaccuracies due to unavoidable rotational movement in the bearing arrangement.

Figure 1:
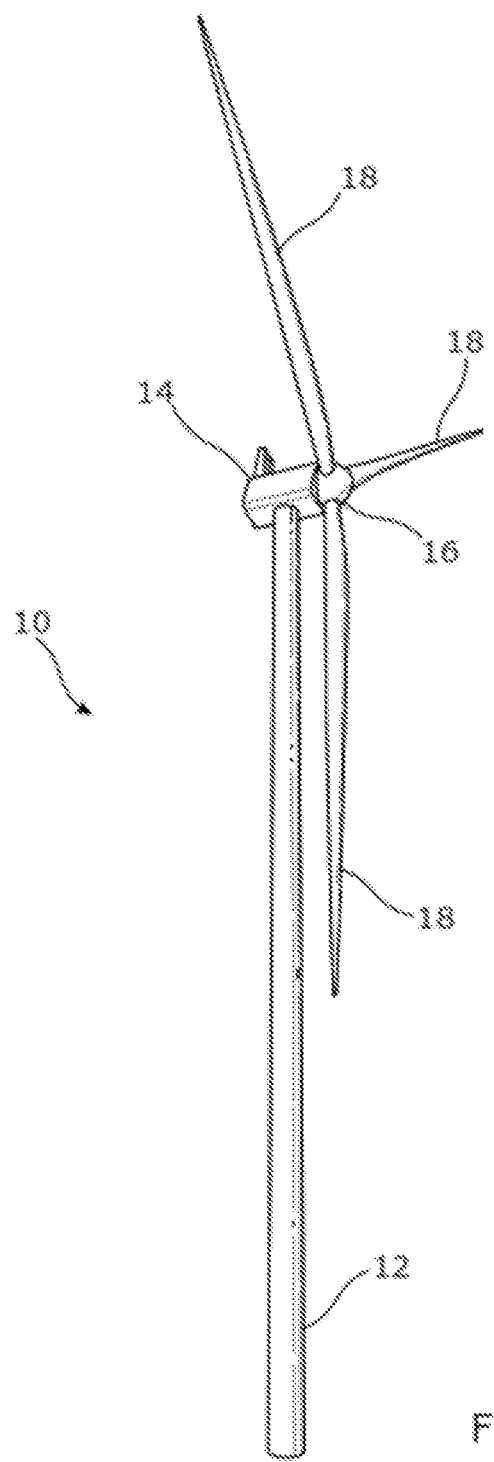
FIG. 1 is a front view of a wind turbine to provide context to the invention.

In order to place the embodiments of the invention in a suitable context, reference will firstly be made to FIG. 1, which illustrates a typical Horizontal Axis Wind Turbine 10 (HAWT) in which a bearing arrangement may be implemented.

The wind turbine 10 comprises a tower 12, a nacelle 14 rotatably coupled to the top of the tower 12 by a yaw system (not shown), a rotating hub or 'rotor' 16 mounted to the nacelle 14 and a plurality of wind turbine rotor blades 18 coupled to the hub 16. The nacelle 14 and rotor blades 18 may be turned and directed into the wind direction as required by the yaw system.

As would be well known by a skilled person, the nacelle 14 houses a powertrain, which includes a gearbox and a generator which are driven by a main shaft connected to the hub 16. The gearbox steps up the rotational speed of the low speed main shaft via internal gears (not shown) and drives a gearbox output shaft (not shown). The gearbox output shaft in turn drives the generator, which converts the rotation of the gearbox output shaft into electricity.

Figure 2:
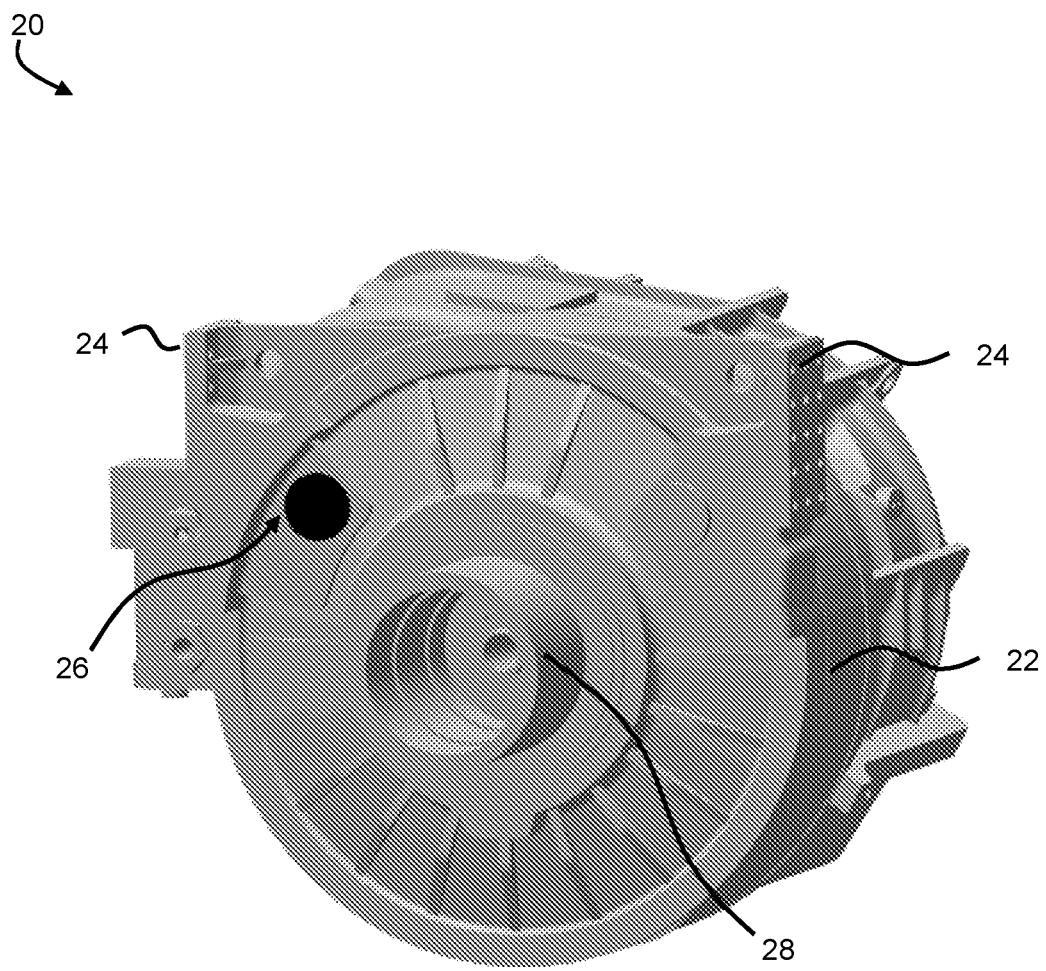
FIG. 2 is a perspective view of transmission component of the wind turbine.

It will be noted that the powertrain components of the wind turbine are not shown in FIG. 1, but FIG. 2 shows an example of a gearbox 20 to which this invention applies. As can be seen the gearbox 20 includes a generally cylindrical gearbox housing 22 and defines various features 24 for mounting the gearbox 20 within the nacelle and for mounting other components to the gearbox 20. Such mounting features are not central to the invention and so further discussion is not necessary.

Notably, the gearbox 20 includes an inspection port 26. The inspection port 26 provides an opening into the interior of the gearbox 20 which permits visual inspection of components located near to the inspection port 26. FIG. 2 provides one possible location of the inspection port 26, but it should be appreciated that inspection ports in other locations may be provided in dependence on the requirement to permit an internal view into the gearbox 20. Such inspection ports may be provided with a suitable closure (not shown), such as a hinged or rotating door panel or a removable plug.

The gearbox 20 includes various bearing arrangements. For example, an input shaft 28 may be supported by an associated bearing arrangement (not shown), and the gearbox may also include a plurality of planetary gears which include their own associated bearing arrangements in the case of where the gearbox is an epicyclic gearbox.

Figure 3:
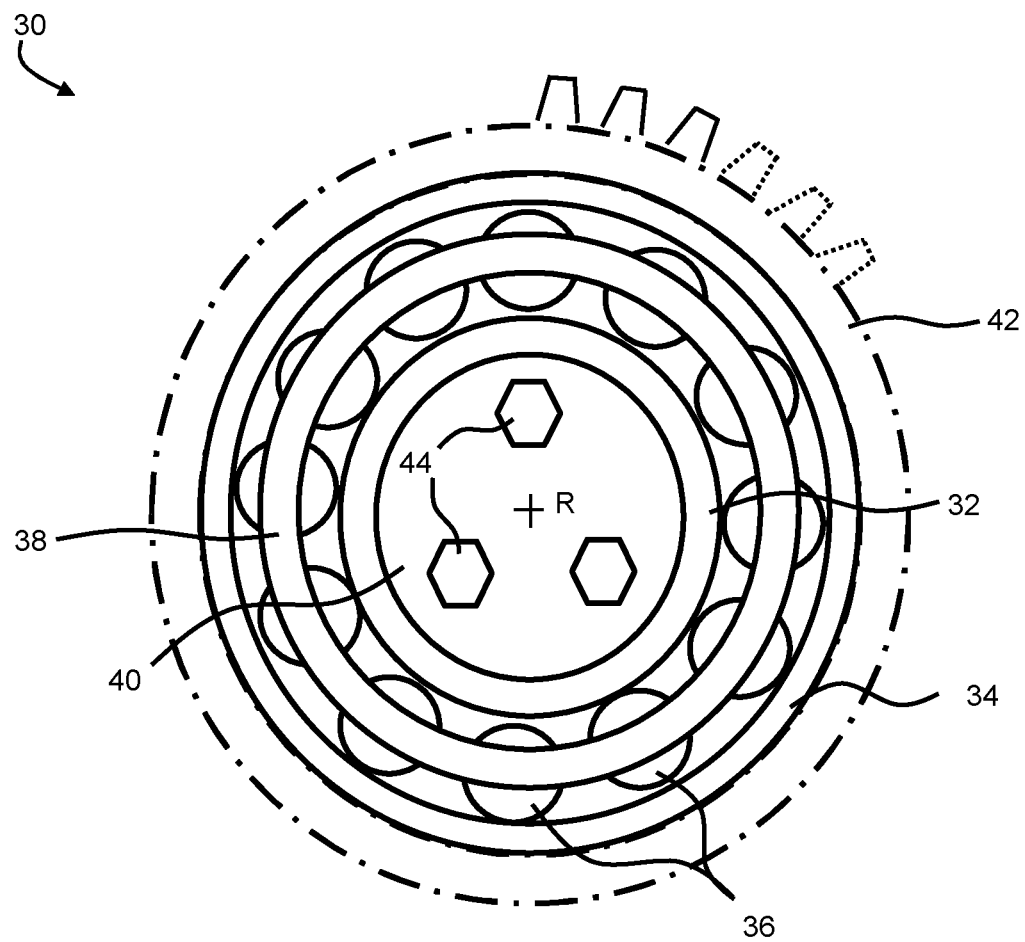
FIG. 3 is a schematic view of a bearing arrangement that may be housed within the transmission component of FIG. 2.

An example of such a bearing arrangement 30 is shown in FIG. 3, and the skilled person would appreciate that the bearing arrangement would be suitable for use as a planet gear in an epicyclic gearbox.

In overview, the bearing arrangement 30 includes an inner ring 32, an outer ring 34 and a set of rollers 36 that are constrained between the inner ring 32 and the outer ring 34. The rollers 36 are received in a bearing cage 38. It should be noted for the purposes of this discussion that the bearing arrangement 30 can be considered to be conventional, and as such the various components that are shown and described here are for putting the invention into a suitable context. Furthermore, it should be noted that FIG. 3 is schematic in form, and so it will be appreciated that the precise structure of the inner ring 32, outer ring 34, the bearing cage 38 and rollers 36 may vary in a practical application.

The inner ring 32 is received on a central shaft 40 that defines a rotational axis R for the bearing arrangement 30. In this example, the shaft 40 is stationary with respect to the outer ring 34 and can be considered to be mounted on a suitable supporting structure, such a planet carrier (not shown in FIG. 3, but depicted in FIG. 4). The shaft 40 therefore serves as a mounting point for a toothed outer ring 42, which the bearing arrangement 30 permits to rotate about the axis R. The toothed outer ring 42 is shown here in partially dashed view for the purpose of clarity. In this example, the shaft 40 is mounted to its supporting structure by a set of mounting bolts 44. These could take various forms but are shown here as having hexagonal heads, as is conventional.

Figure 4:
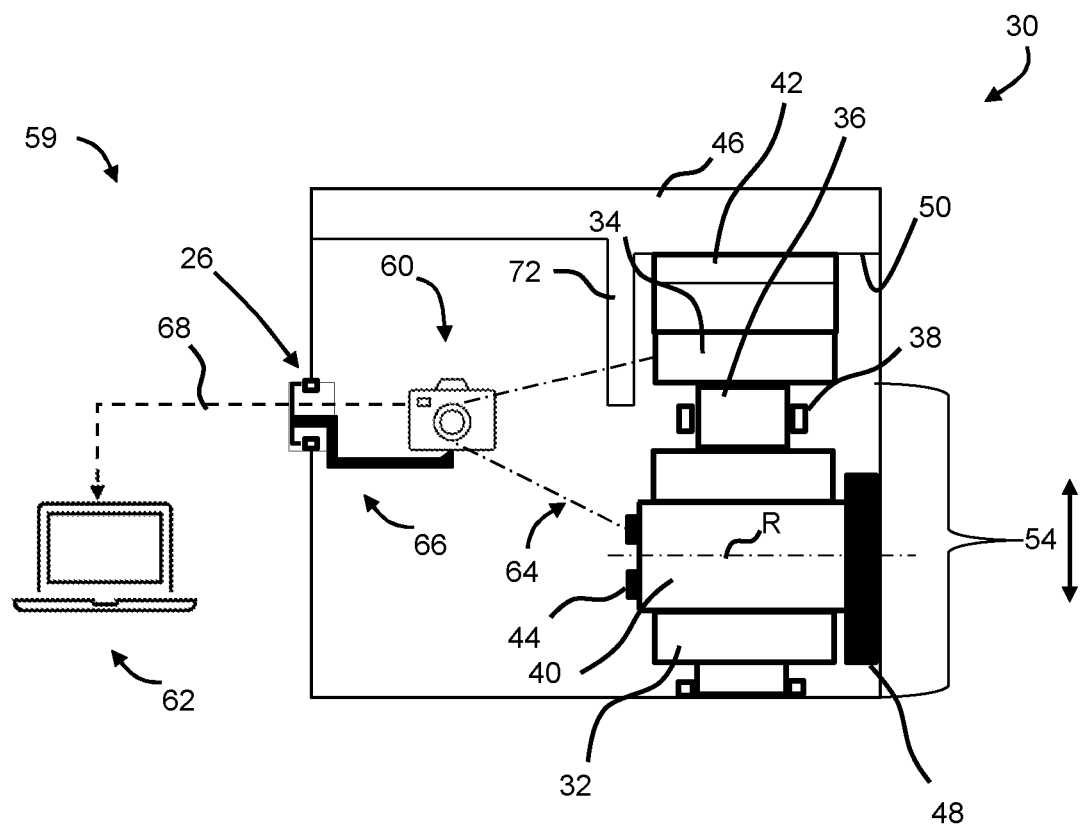
FIG. 4 is a schematic view of an apparatus for determining the radial play of a bearing arrangement of the transmission component, in accordance with an embodiment of the invention.

FIG. 4 shows a side view of the bearing arrangement 30 in a portion of a gearbox housing 46. Again, it should be noted at this point that FIG. 4 is schematic in form and so the precise layout should not be considered a practical application, but instead to illustrate the principle of the invention.

As can be seen in FIG. 4, the bearing arrangement 30 is in the form of a planet gear and the shaft 40 is supported on a portion of a planet carrier 48 which serves as a supporting structure for the shaft 40. The toothed ring 42 meshes with inwardly facing ring gear 50 that is defined by the gearbox housing 46.

As has been discussed above, the radial play in a bearing arrangement 30 is a crucial wear factor and it must be monitored closely, particularly in high load applications. Excessive radial play can cause shaft misalignment which increases contact pressure on gear teeth and can lead to premature failure of some of those teeth. This is true in the context of a planetary gear arrangement as depicted in FIG. 4, and also in the context of a different gear arrangement comprising intermeshing gear wheels carried on respective shafts.

As would be understood by the skilled person, radial play in the gear arrangement 30 as shown in FIG. 4 is generated due to wearing of the races defined by the inner and outer rings 32,34. As the races wear, the rollers 36 are constrained by an increased radial space which will allow the shaft 40 to move radially. As illustrated by the grouped set of components identified at 54, the shaft 40, the inner ring 32 and the rollers 36 are able to move radially, that is in a direction perpendicular to the gear axis R, in response to loading exerted on the shaft 40 by the planet carrier 48.

The invention provides a process by which the radial play in a bearing arrangement can be monitored more effectively than conventional techniques.

With reference to FIG. 4, a measurement system 59 includes a camera 60 and a computer system 62. The camera 60 is shown in a position inside the housing 46 and it will be appreciated that the camera 60 is arranged so that it is able to capture an image of a predetermined region or viewing area 64 of the bearing arrangement 30. The predetermined region 64 is shown in FIG. 4 by the dashed lines that extend from the camera 60 to the bearing arrangement 30.

In this example, the camera 60 is positioned inside the housing 46 because it is convenient to do so. However, it is also an option for a camera or equivalent imaging device to be located outside of the housing 46, as long as the camera is afforded an adequate view of the predetermined region 64 of the bearing arrangement 30. In one example, it is envisaged that a camera may be located outside of the housing 46, but an endoscopic-type lens could be arranged to extend inside the housing. What matters is an appropriate imaging system or camera is able to capture a required scene of relevant components inside the housing 46.

As shown, the camera 60 is supported within the housing 46 by a support bracket 66. The support bracket 66 may take various forms and simply provides a means to support the camera 60 in the appropriate position. In this example, it can be seen that the support bracket 66 is attached to and extends away from the inspection port 26 of the housing 46.

The camera 60 is interfaced to the computer system 62. The computer system 62 may be any general-purpose computer system that has the required capability to run appropriate software with which to perform the comparison process described here. As such, the computer system 64 may be a desktop or a laptop machine as is available commercially at the time of writing. In a similar manner the camera 60 may be any suitable digital camera that has the required resolution to capture appropriate images. An example of a suitable camera for the task is the Canon IXUS 285 HS, which is available commercially and provides a 20.2-megapixel imaging system. Other cameras would also be suitable.

The camera 60 is coupled to the computer system 62 by a suitable data link 68. The data link 68 may be any suitable method for transferring data, but typically that is achievable by way of a wired connection such as a USB cable, or a wireless connection using a suitable wireless protocol such as Bluetooth®. Such hardware is conventional and so further discussion will be omitted.

Having described the general context of the invention in terms of the bearing arrangement 30 layout and the computing hardware, the discussion will now turn to an example method of the invention.

In a broad sense, the method involves capturing respective images of the bearing arrangement 30 before and after the position of the bearing arrangement has been shifted through its range of radial play, and then comparing those images in order to determine the extent of radial play in the bearing arrangement. By examining the shift in the relative positions of different bearing components between the two images, it is possible to determine the extent of radial play of the bearing arrangement. It is worth noting that the components considered in this approach are components whose positions relative to each other are affected by radial play. For example, in the example bearing arrangement discussed here, radial play will permit the shaft 40, the inner ring 32, the rollers 36 and the bearing cage 38 to move relative to the outer ring 34 and the housing 46. Therefore, it is important that the two components that are compared are able to move relative to one another during radial play.

The method will now be discussed step-by-step for a more in depth understanding with reference also to FIGS. 5a, 5b and 6.

Figure 5A:
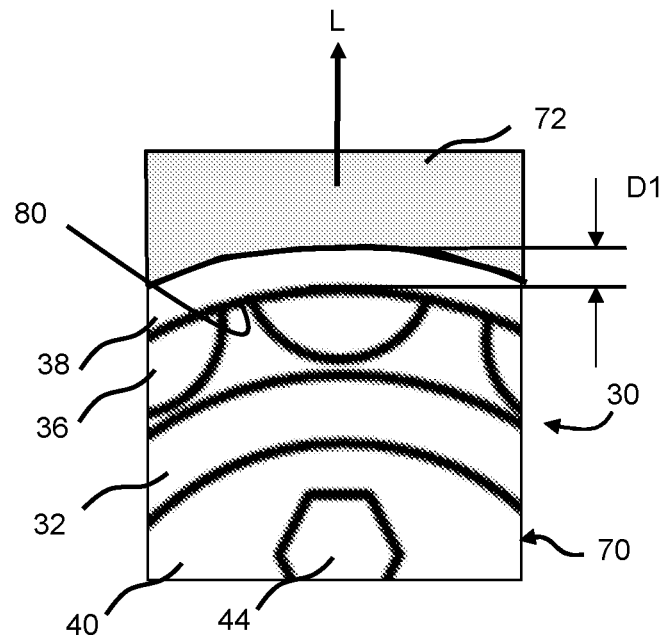
FIGS. 5a and 5b are schematic views of the bearing arrangement in two comparative positions which help to illustrate the principle of the invention.
Figure 6:
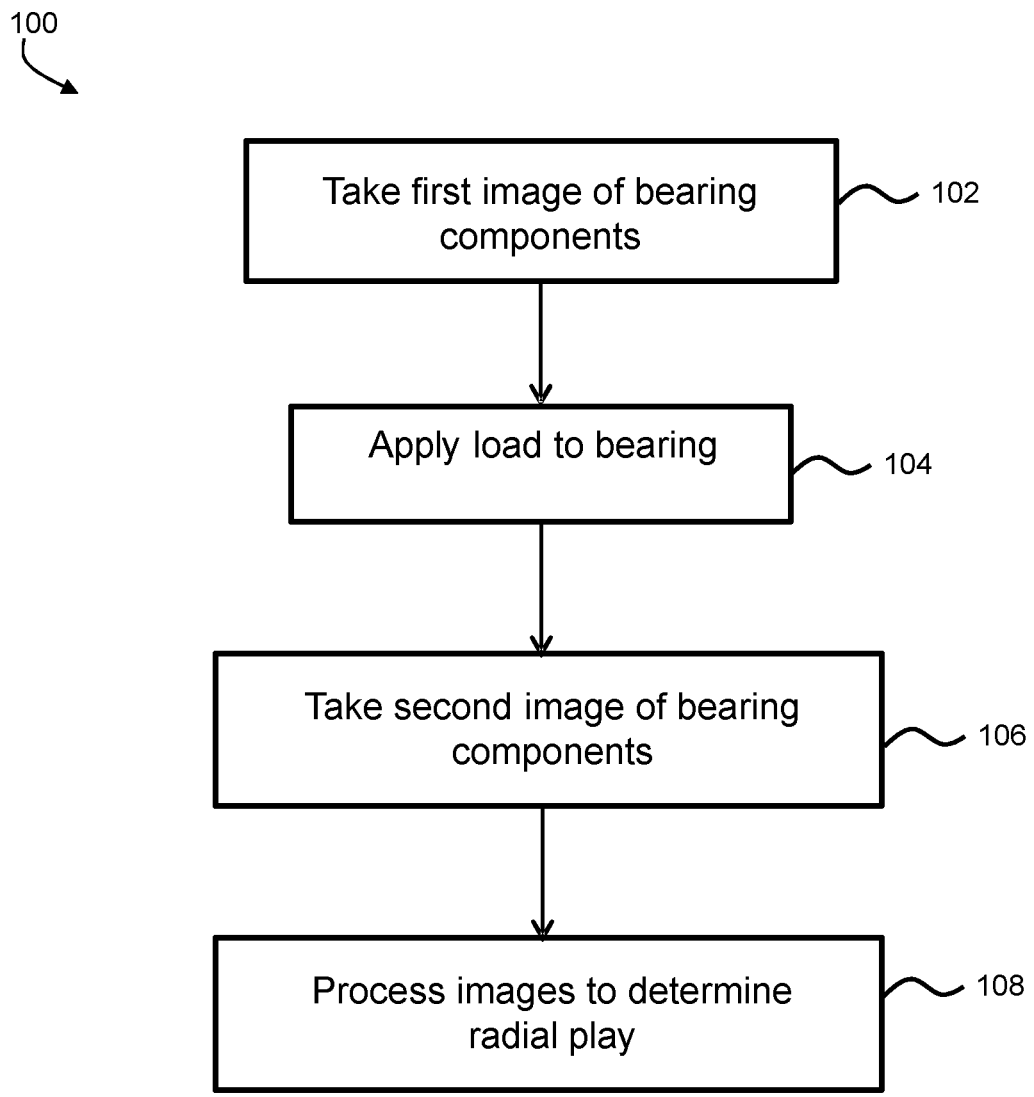
FIG. 6 is a flowchart of a process to determine radial play in a bearing assembly, by way of further explanation of the invention.

In FIG. 6, the method 100 starts at step 102 with taking a first image of the bearing arrangement 30. The first image is seen labelled as '70' in FIG. 5a and shows the predetermined region 64 of the bearing arrangement 30 that is captured by the camera 62.

By comparing the first image 70 with the viewing perspective indicated by the predetermined region 64 in FIG. 4, it will be noted that the shaft 40 and mounting bolts 44, the inner ring 32, the rollers 36 and the bearing cage 38 can all be seen in the first image 70. However, it will also be noted that in the upper part of the first image 70, a portion of the housing 46 is visible, as is labelled at '72'. The housing portion 72 in this example extends in a radial direction and covers up a portion of the bearing arrangement 30. It should be appreciated that the housing portion 72 is stationary with respect to the components of the bearing arrangement 30 in the first image.

From the first image, it is apparent that there is a radial separation between the housing portion 72 and the bearing cage 38, more specifically a radially inward edge 80 of the bearing cage 38. The radial separation between these components is illustrated in FIG. 5a as parallel lines extending at respective tangents from the housing portion 72 and the bearing cage 38, and is labelled as dimension D1. Expressed another way, the dimension D1 quantifies the relative position of a first component of the bearing arrangement, that is to say the bearing cage 38, with respect to a second component, that is to say the housing portion 72 at one extreme of radial play.

At this point it should be appreciated that in order to capture an accurate image, and ensure accurate determination of dimension D1, the bearing arrangement 30 should not be rotating. So, in the current context of a wind turbine, the powertrain should be in a locked condition to ensure that the main rotor shaft, and the rotating components of the gearbox are in a rotationally locked state.

Following the capture of the first image 70, the bearing arrangement 30 has a load applied to it to take up the radial play, as is indicated at step 104. In this context, in a rotational 'at rest' state the bearing arrangement 30 will experience a load in a vertically downward direction, in the orientation of the drawings, which may be at least partly due to the load imposed on the bearing arrangement 30 by the shaft 40 which is itself loaded by the planet carrier 48. Furthermore, gravity will also play a role creating a load in a vertically downward direction. Therefore, the bearing arrangement 30 will be at rest in one extreme radial position allowed by the radial play. In order to determine the extent of radial play, a force in the upward vertical direction must be applied to the bearing arrangement 30 in order to move the appropriate components to the opposite extreme position allowed by the radial play of the bearing arrangement 30. One way in which this may be achieved in the illustrated example is by applying an upwards force to the shaft 40. In this context, the term 'upwards' means that a force is applied in the direction of action of radial play, and so could also be considered as a radially applied load. It is more pronounced in the vertical direction in this example, but it could also act in other radial planes passing through the axis R of the shaft 40. A suitable force may be applied by jacking up a shaft associated with the planet carrier, for example, which would also apply a lifting force to the shaft 40.

The application of the radial load to the shaft 40 in effect means that the inner bearing ring 32, the rollers 36, and the bearing cage 38 move upwards in the first image 70 so as to reduce the separation between the radially inward edge 80 of the bearing cage 38 and the adjacent housing portion 72. Therefore, application of the radial load in the direction arrow L will act to reduce the dimension D1.

Following the application of the radial load on the bearing arrangement 30, the method 100 moves to step 106, which comprises a second image being taken by the camera 62. The second image is identified as reference '82' in FIG. 5b.

Figure 5B:
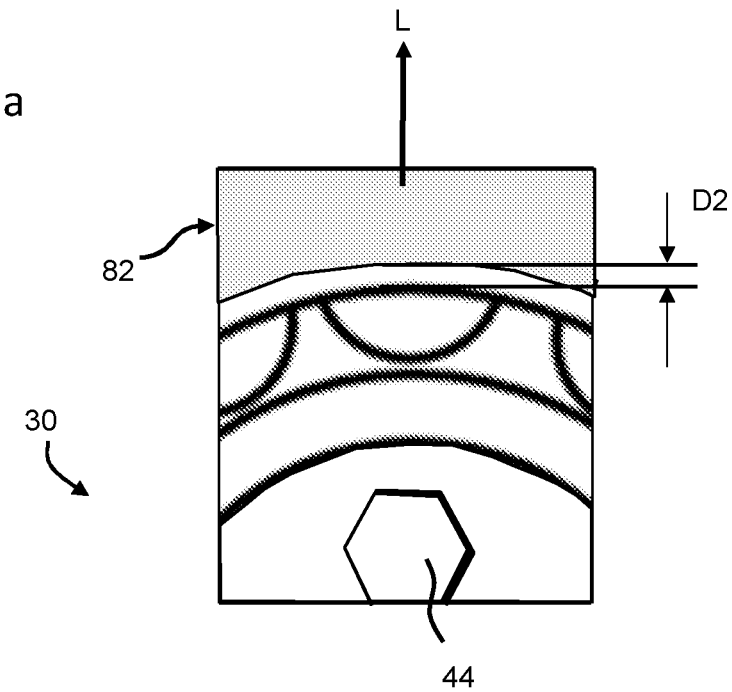

By comparing the second image 82 of FIG. 5b with the first image 72, as shown in FIG. 5a, it can be seen that the components of the bearing arrangement 30, namely the shaft 40, the inner bearing ring 32, the rollers 36 and the bearing cage 38, have moved upwards in the direction L. Therefore, the separation between the radially inward edge 80 of the bearing cage 38 and the adjacent housing portion 72 has been reduced compared to the same dimension in FIG. 5a. Therefore, the bearing cage 38 and the housing portion 72 are in a second relative position. This is represented by dimension D2 in FIG. 5b, which can be seen as being noticeably smaller than dimension D1 as shown in FIG. 5a.

Following capture of the first image 70 and the second image 82, they are transferred to the computer system 74. The image data transfer can take place after each image has been taken, and it is also acceptable to transfer the images together as a batch. Moreover, the images may be transferred as soon as they are captured, or they may be transferred to the computer system 62 at a later time and at a different location. The images therefore don't have to be transferred at the same time as they are taken.

Once the first image 70 and the second image 82 are transferred to the computer, they can be processed in order to calculate the values of the dimensions D1 or D2. This is indicated at step 108 in FIG. 6.

Analysis of the two images 70,82 may be done in various ways. One option is to use commercially available software to view each image on a display screen of the computer system 62. In this way, a user is able to measure the dimension D1 in the first image 70 and the dimension D2 in the second image 84. The measurements may be taken directly from the display screen. However, a preferred option is to use suitable software to take the measurements from the images. A suitable software package for this task would be Autodesk AutoCAD Mechanical 2014.

In order to ensure that the dimensions D1 and D2 are accurate and true to life, they should be referenced to a scale. One way in which this may be achieved is to use a known feature in one of the images as a datum. A suitable feature may be an engraved reference line of a predetermined length that is made on a component visible in either or both of the two images 70,82. For example, a reference line could be engraved or etched on the end face of the shaft 40. Another option, as illustrated in FIGS. 5a and 5b, is to use the known characteristics of the mounting bolts 44. For example, the hexagonal head of each mounting bolt 44 has six edges of equal length. Since that edge length is known, it can be used as a reference, or datum, to ensure that the dimensions D1 and D2 as measured from the first and second images, respectively.

Once the two relative positions between the bearing cage 38 and the housing portion 72 have been determined from the first and second images (that is, the two dimensions D1 and D2 have been calculated), it is then possible to determine the radial play by subtracting D1 from D2 to determine a difference value. This therefore enables the radial play of the bearing arrangement to be quantified, and so a direct comparison can be made between the actual radial play and a threshold value that represents what is an acceptable level of radial play. So, if the difference value exceeds the threshold value, then this may trigger a suitable maintenance action such as a gearbox refurbishment.

The above discussion about the illustrated examples of the invention refers to various adaptions and modifications that may be made to those examples, without departing from the scope of the invention as defined by the claims. Other variants would be apparent to the skilled person.

It should be noted that although the illustrated example of the invention has been placed in the context of a planetary gear stage in a gearbox, it would also be useful in the context of a spur gear in a wind turbine gearbox, and in particular for an intermediate spur gear stage in a three-stage gearbox. Such gear stages are typically difficult to access in order to determine the radial movement of the toothed spur gear. Therefore, the method of the invention provides a reliable way to determine radial play which avoids the need to access the outer toothed surface of spur gears in a gearbox.

The invention claimed is:

1. A method for determining radial play of a bearing arrangement in a wind turbine gearbox in a wind turbine, the method comprising:
    providing the bearing arrangement in the wind turbine gearbox in the wind turbine, the bearing arrangement comprising at least a first component and a second component which are movable relative to one another in a radial direction to define the radial play of the bearing arrangement;
    capturing a first image of the bearing arrangement, wherein the first image includes the first component and the second component in a first relative position, said first relative position corresponding to an extreme radial position allowed by the radial play of the bearing arrangement;
    applying a radially-directed load to the bearing arrangement to move the first component radially with respect to the second component by a distance that defines the radial play of the bearing arrangement so that the first and second components are in a second relative position, said second relative position corresponding to an opposite extreme radial position allowed by the radial play of the bearing arrangement;
    capturing a second image of the bearing arrangement, wherein the second image includes the first component and the second component in the second relative position; and
    comparing the first and second images to quantify the difference between the first relative position of the first and second components and the second relative position of the first and second components, thereby to determine the radial play in the bearing arrangement.

2. The method of claim 1, wherein the comparing the first image and the second image comprises:
    determining a first dimension (D1) between the first component and the second component in the first image;
    determining a second dimension (D2) between the first component and the second component in the second image;
    comparing the first dimension and the second dimension to find a difference value;
    determining whether the distance value exceeds a radial play threshold.

3. The method of claim 1, wherein at least one of the first and second images includes a reference feature of the bearing arrangement, wherein the reference feature has a predetermined size thus providing a datum for the comparison.

4. The method of claim 3, wherein the reference feature is a feature of predetermined length defined on a surface of the bearing arrangement.

5. The method of claim 3, wherein the reference feature is a component that is a different component to the first and second components.

6. The method of claim 1, wherein the first component is one or more of: i) a bearing cage, ii) a roller element, and iii) a bearing ring.

7. The method of claim 1, wherein the second component is a housing portion of the bearing arrangement.

8. The method of claim 1, wherein, before capturing the first image, a camera is supported inside a housing of the wind turbine gearbox.

9. The method of claim 8, wherein the camera is removed from the housing after capturing the second image.

10. The method of claim 8, wherein the first image relates to a predetermined region of the bearing arrangement, and second image relates to the same predetermined region of the bearing arrangement.

11. The method of claim 1, wherein the first image and the second image are displayed on a display screen of a computer system.

12. The method of claim 1, wherein said wind turbine gearbox comprises at least two gear stages.

13. The method of claim 12, wherein said wind turbine gearbox comprises at least one planetary gear stage and at least one spur gear stage.

14. The method of claim 8, wherein said wind turbine gearbox includes an inspection port through which said camera is inserted before capturing the first image.

15. The method of claim 1, wherein said wind turbine gearbox is in a rotationally locked state when capturing the first image of the bearing arrangement.

* * * * *